Feb. 24, 1970  D. R. KNOUSE  3,496,751
DRAW BLOCK WITH HOLDER MECHANISM
Filed Oct. 6, 1967  3 Sheets-Sheet 1

INVENTOR
DALE R. KNOUSE

BY
Oberlin, Maky, Donnelly & Renner
ATTORNEYS

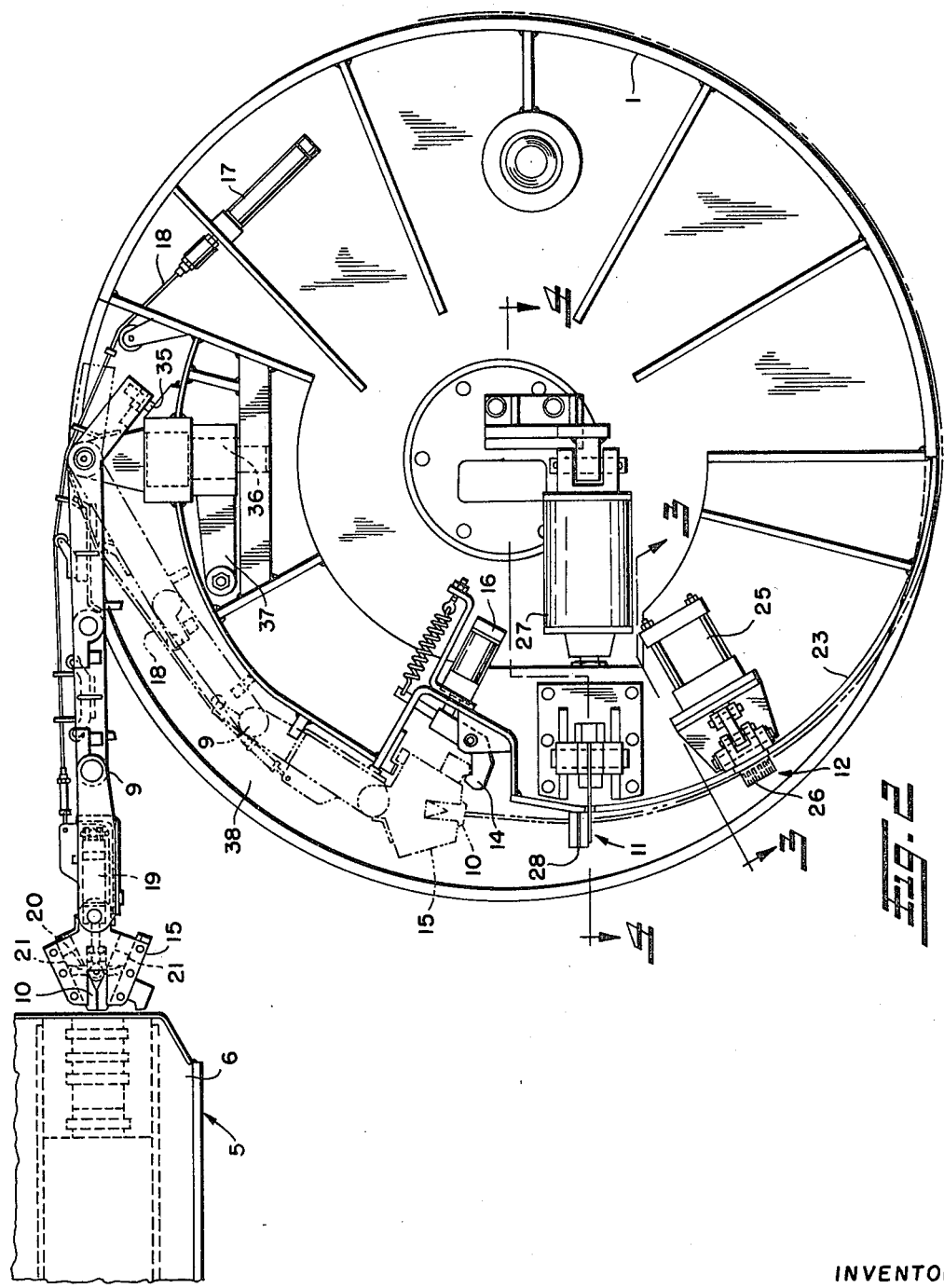

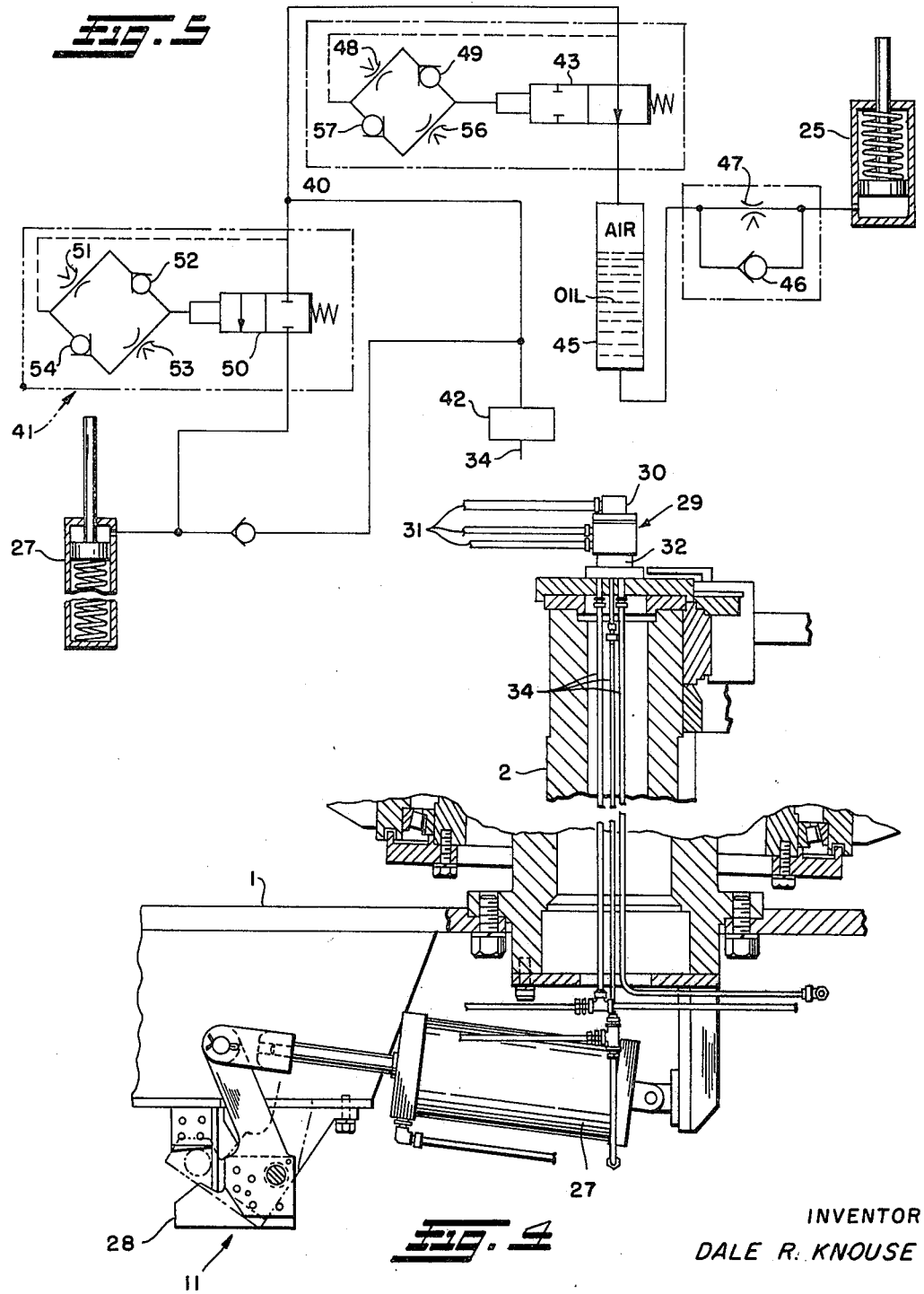

United States Patent Office 3,496,751
Patented Feb. 24, 1970

3,496,751
DRAW BLOCK WITH HOLDER MECHANISM
Dale R. Knouse, Cuyahoga Falls, Ohio, assignor to The Vaughn Machinery Company, Cuyahoga Falls, Ohio, a corporation of Ohio
Filed Oct. 6, 1967, Ser. No. 673,365
Int. Cl. B21c 1/14
U.S. Cl. 72—275                                10 Claims

ABSTRACT OF THE DISCLOSURE

Draw block for tubing and the like characterized in the provision of (1) a gripping mechanism operative to draw tubing through a die and to wrap it around the block; (2) a shearing mechanism operative to shear the tubing adjacent the gripping mechanism for continued drawing after filling of the block; and (3) a holder mechanism operative to gradually release the tension in the tubing wrapped around the block when the tubing is thus sheared. Such gradual release of tension in the long length of tubing wrapped around the block eliminates severe shock loads on the draw block and its drive mechanism and on the drawing die and its mounting and also eliminates whipping of the cut end of the tube with consequent injury to workmen thereabout or damage to adjoining equipment.

Background of the invention

It is known as disclosed, for example, in the patents to McIlvried 1,821,845, and 2,748,924, to provide a generally cylindrical draw block equipped with gripping jaws movable into a peripheral recess in the block to grip the pointed end of the tube (or wire or rod) immediately adjacent the die and to initially exert a straight pull on the tube before bending the tube around the draw block. To that end, the die box is generally mounted for movement parallel to the axis of the block and may also be pivotally mounted to enable helical winding of the tubing about the draw block to clear such recess. Furthermore, the draw block may be provided with a tilted push-up or push-down apron or flange, whereby the convolutions of the tubing are progressively advanced axially along the block. In the aforesaid Patent 2,748,924, as the drawing operation continues, the gripping jaws are moved upwardly along with the gripped end of the drawn tubing.

In order to provide for continuous drawing after filling of the block, it is necessary either to release the pointed end of the tube from the gripper jaws, or else to shear the tube adjacent the gripper jaws whereby the tubing may be continuously removed from the end of the draw block for producing long tube lengths as well as for performing further drawing operations, heat treating operations, or final packaging.

In the case of 1¾" diameter tubing, for example, it may be drawn around a block of say 7' diameter and may have 15 or 20 wraps therearound under substantial tension at the time that it is desired to release or cut the tubing for continuous drawing. Accordingly, if the end of the tubing is sheared or released from the gripper jaws, there will be considerable spring-back in the several hundred feet of tubing thus wrapped around the draw block, and if this spring-back or tension release is allowed to occur suddenly as by shearing the tube or by opening the gripper jaws, severe shock loads will be imposed on the draw block and its drive mechanism as well as on the die box and its mounting, aside from the fact that the sheared or released end may whip out from the rotating draw block and cause injury to workmen or damage to adjoining equipment.

Summary of the invention

In view of the foregoing, it is a principal object of this invention to provide a draw block of the character indicated having a holder mechanism adjacent the shearing mechanism thereof, whereby when the tubing adjacent the gripper jaws is sheared, the holder mechanism provides for a gradual release of tension in the plurality of wraps of the tubing around the draw block thus to eliminate the aforesaid severe shock loads on the equipment.

It is another object of this invention to provide a latch mechanism for the gripper jaws which is automatically engaged with the gripper jaws and the jointed arm which carries the same after the initial straight pull operation whereby when the tubing is sheared adjacent the gripper jaws, the latter cannot fly outward of the draw block recess and the arm and jaws are kept clear of the surrounding coiled tubing which is progressively shifted axially beyond the gripper jaws.

It is another object of this invention to provide a draw block of the character indicated having novel means for actuating the gripper jaws from nested position in the draw block recess to an operating position tangential of the block and in line with the die box to provide for the initial gripping of the pointed end of the tube to achieve a straight pull at the beginning of the drawing operation.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Brief description of the drawings

FIG. 2 is a top plan view illustrating the adjacent shearing and holding mechanisms disposed in the upper peripherally recessed portion of the block into which the gripper jaws move after the initial straight pull on the tubing;

FIG. 4 is a cross-section view along the line 4—4, FIG. 2 illustrating the shearing mechanism and the tubular drive shaft which accommodates the piping for the actuating cylinders for the gripper, latch, shearing and holder mechanisms; and FIG. 5 is a schematic piping diagram illustrating the control valves for achieving actuation of the holder cylinder and the shear cylinder in sequence.

Discussion of the invention

Figure 3:
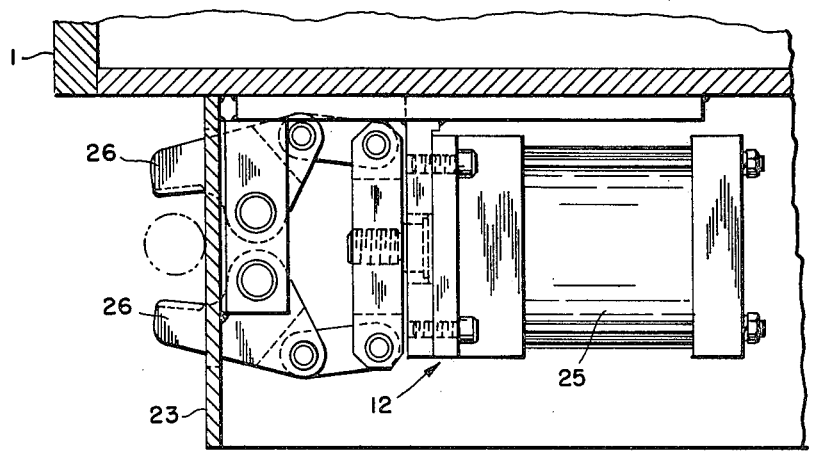
FIG. 3 is a cross-section view taken substantially along the line 3—3, FIG. 2 illustrating the holder mechanism and its actuating cylinder.
Figure 1:
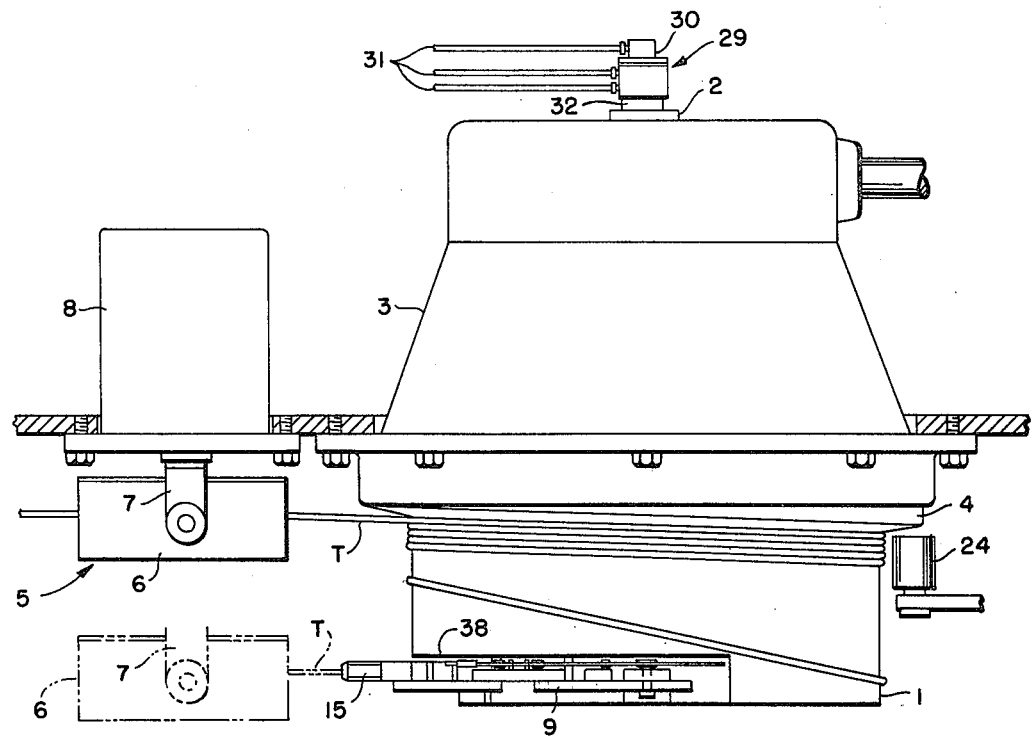
FIG. 1 is a side elevation view of a draw block embodying the present invention.

Referring to FIG. 1, and also FIG. 4, the draw block 1 is driven by a tubular drive shaft 2 which is journalled in the housing 3. Adjacent the upper end of the draw block 1 is a push-down apron or flange 4 which is tilted with respect to the axis of the draw block so that as the tubing is drawn therearound the successive convolutions are forced downwardly. Reference may be had, for example, to the McIlvried Patents 2,658,61 and 2,748,924, for examples of tilted push aprons and the manner of driving the same through a ball or spring connection between the draw block and the apron. Adjacent the housing 3 there is mounted a die box assembly 5 having a die box 6 pivotally mounted to the piston rod 7 of an actuating cylinder 8.

The lower end of the draw block is recessed for reception of the jointed or chain-like support arm 9 for the gripper jaws 10 and also the shearing and holding mechanisms 11 and 12.

In starting the drawing operation the die box 6 is first shifted to the dot dash position of FIG. 1, and the self-engaging spring latch 14 is released from gripper jaw housing 15 by actuation of the cylinder 16. Then, pressure in the cylinder 17 draws in the cable 18 to swing out the gripper support arm 9 from the dot dash position to the straight solid line position of FIG. 2, thus to align the gripper jaws 10 with the axis of the die box 6. Prior to the time of the release of the latch 14 fluid pressure may be admitted into the rod end of the jaw actuating cylinder 19 to open the jaws 10 to release the pointed end of the previously sheared tube. Thus, a new pointed tube T is inserted through the die box 6 with the end disposed between the separated jaws 10. Fluid under pressure is then admitted into the head end of the jaw actuated cylinder 19, whereby the cross head 20 moves the jaws 10 along the inclined guides 21 in gripper housing 15 into gripping engagement with the pointed end of the tube T.

The draw block 1 is then ready to be driven in a clockwise direction, as viewed in FIG. 2, whereupon the gripping jaws 10 will pull the tube through the die box 6 along a straight line coinciding with the axis of the die box 6 until the tubing contacts the curved wall 23 of the block recess. Thereafter, the die box 6 may be gradually moved upwardly as the draw block 1 continues to rotate thus to helically wrap the tube T around the draw block 1, the die box 6 at the same time pivoting about horizontal and vertical axes to maintain a straight pull tangentially of the draw block 1.

As the drawing operation is continued the die box assembly 5 will reach the solid line position of FIG. 1 whereat the push-down apron 4 will be effective to progressively push down successive convolutions as they are formed around the draw block 1. When there are sufficient wraps of the tubing around the draw block 1 such that the drawing operation may be continued with the successive convolutions being thereafter shoved downwardly below the gripper jaws 10, the tubing T may be cut to permit such downward movement of the convolutions. Before the tube T is cut, a pressure roll 24 may be moved toward the draw block to hold the convolutions thereagainst so that the drawing operation may be continued by friction of the wraps around the block 1.

When there are sufficient wraps of tubing T around the block 1 to enable continued drawing by the friction of the convolutions pressed against the block 1 by the pressure roll 24, fluid under pressure is first admitted into the holder cylinder 25 to move the holder jaws 26 into frictional engagement with the tubing T, and then fluid under pressure is admitted into the shear cylinder 27 to actuate the shear blade 28 to cut the tubing T between the holder mechanism 12 and the gripper jaws 10.

As aforesaid, the draw block 1 may have several hundred feet of tubing T wrapped therearound under substantial tension at the time that the shearing cut is ready to be made, and thus there would be several inches of spring-back if the tubing T were sheared or released from the gripping jaws 10 with prior known mechanisms. Herein, the holder jaws 26 frictionally engage the tube T adjacent the point of shearing so as to gradually relieve such great tension in the tube T. The distance between the shear blade 28 and the holding jaws 26 is sufficient to accommodate the total length of spring-back of the tube T. In this way, severe shock loads are avoided on the draw block 1 and its drive mechanism as well as on the die box assembly 5. Moreover, if the tubing T were merely sheared without the present holding mechanism 12, the tubing T in suddenly springing back or relieving its tension might cause the free end to whip out from the rotating draw block 1 to cause personal injury or damage to adjoining equipment.

As shown in FIGS. 1 and 4, the upper end of the drive shaft 2 has a swivel coupling assembly 29 secured thereto, the body portion 30 thereof having fluid pressure supply conduits connected thereto and the rotating part 32 thereof having affixed thereto conduits 34 which extend through the tubular drive shaft 2 of the draw block 1 for connection with the various actuating cylinders 16, 17, 19, 25, and 27.

The linked gripper arm 9 has a stop screw 35 to align the gripper jaws 10 with the axis of the die box 6, and the supporting shaft 36 for said arm 9 has a spring-biased arm 37 which yieldably holds the arm 9 free of the surface 38 of the draw block 1. When the jaw housing 15 has been moved to the dot-dash position of FIG. 2 the spring latch 14 automatically holds said housing 15 and arm 9 in the recess of block 1 inside the periphery of block 1.

Referring in detail to FIG. 5, only the holder and shear cylinders 25 and 27 have been illustrated with their respective control valves 40 and 41, and it is to be understood that two of the conduits 34 will be connected by means of suitable flexible hoses (not shown) to the double acting jaw actuating cylinder 19 while another of the conduits 34 may be connected through flexible hoses or the like to the latch and arm actuating cylinders 16 and 17 with an appropriate sequence valve (not shown) upstream of the arm actuating cylinder 17 to assure release of the latch 14 before swinging out of the arm 9 to its solid line position of FIG. 2. Preferably, the valves (not shown) for controlling the cylinders 19, 16, and 17 will be connected to conduits 31 upstream of the coupling 29, whereas the valve 42 is in the conduit 34 (downstream of coupling 29) that supplies jaw closing pressure to cylinder 19. When there is jaw closing pressure in conduit 34 in FIG. 5, and when valve 42 is opened, air will flow through the normally open valve member 43 into the air-oil chamber 45 thereby displacing oil through the check valve 46 and variable restrictor 47 into the holder cylinder 25 thus to cause the holder jaws 26 to grip the tubing T. As the holder pressure increases, the air pressure buildup through variable restrictor 48 and check valve 49 moves the valve member 43 to closed position to maintain holding pressure in the cylinder 25.

Buildup of pressure in the holder circuit causes shifting of the normally closed valve member 50 to open position by pilot pressure through variable restrictor 51 and check valve 52. When valve member 50 moves to open position, the shear cylinder 27 is actuated to effect cutting of the tubing T while the end of the tubing is gripped between the jaws 10 and held between the jaws 26 of the holder mechanism 12.

When the pressure in conduit 34, FIG. 5, is released or when valve 42 is operated to exhaust the shear and holder circuits, the shear cylinder 27 is exhausted for spring return of the blade 28 to inoperative position with gradual return of valve member 50 to normally closed position by release of pilot pressure through variable restrictor 53 and check valve 54. At the same time, there is a gradual release of pilot pressure on valve member 43 through variable restrictor 56 and check valve 57 for gradual shifting of valve member 43 to normally open position. Moreover, oil pressure in holder cylinder 25 is slowly released through restrictor 47 to enable gradual slipping of the tubing T between the jaws 26 thus to eliminate the severe shock loads on the equipment as previously explained.

Other modes of applying the principle of the invention may be employed, change being made as regards the details described, provided the features stated in any of the following claims, or the equivalent of such, be employed.

I therefore particularly point out and distinctly claim as my invention:

1. The combination of a draw block of the type having stock gripping means operating upon rotation of said block to draw the stock gripped thereby longitudinally through an adjacent die and to wrap the stock in helical coil form around said block; and a holder mechanism on said block operative to grip the stock adjacent said gripping means to prevent sudden release of tension in the stock wrapped around said block in the event of release of said gripping means or of severing of the stock between said gripping means and said holder mechanism.

2. The combination of claim 1 wherein a shearing mechanism on said block is operative to shear the stock between said gripping means and said holder mechanism.

3. The combination of claim 2 wherein said block has means to control the operation of said mechanisms in sequence such that said holder mechanism grips the stock before said shearing mechanism shears the stock.

4. The combination of a draw block of the type having a peripheral recess and a stock gripping means connected to said block for movement into and out of such recess, said gripping means initially extending generally tangentially of said block with said gripping means disposed adjacent a drawing die; said gripping means, upon rotation of said block, being operative to draw the stock gripped thereby longitudinally through said die along a substantially straight line path until said gripping means is disposed in such recess and thereafter to wind the stock drawn through said die around said block in helical coil form; and a holder mechanism in such recess operative to grip the stock adjacent said gripping means to prevent sudden release of tension in the stock wound around said block in the event of release of said gripping means or of severing of the stock between said gripping means and said holder mechanism.

5. The combination of claim 4 wherein a shearing mechanism in such recess is operative to shear the stock between said gripping means and said holder mechanism.

6. The combination of claim 4 wherein said block has latch means in such recess engaged by said gripping means to hold the latter in such recess despite release of the stock from said gripping means or severing of the stock between said gripping means and said holder mechanism.

7. The combination of claim 4 wherein said gripping means comprises a chain-like support arm which is swingably connected in such recess and in which the links are aligned when said arm extends tangentially of said block; and wherein means are provided on said block to pull said arm from circumferentially extending position in such recess to such tangentially extending position.

8. The combination of claim 7 wherein said block has latch means in such recess engaged by said gripping means to hold the latter in such recess; and wherein said block has latch releasing means operative to release said arm for movement out of such recess to tangentially extending position.

9. The combination of a draw block of the type having a peripheral recess and a stock-gripping means at one end of a chain-like support arm which, at its other end, is connected to said block for swinging movement of said arm and gripping means into and out of such recess; said arm initially extending generally tangentially of said block with said gripping means disposed adjacent a drawing die whereby, upon rotation of said block, said gripping means is operative to draw the stock gripped thereby longitudinally through said die along a substantially straight line path until said arm and gripping means are disposed in such recess together with a length of stock adjacent said gripping means and thereafter to wind the stock drawn through said die around said block in helical coil form; and a holder mechanism in such recess operative to grip the stock adjacent said gripping means to prevent sudden release of tension in the stock wound around said block in the event of release of said gripping means or of severing of the stock between said gripping means and said holder mechanism.

10. The combination of claim 9 wherein a holder releasing means on said block is operative to permit controlled slippage of the stock in said holder mechanism thus to gradually release tension in the stock after release of the stock from said gripping means or after severing of the stock between said gripping means and said holder mechanism.

References Cited

UNITED STATES PATENTS 2,748,924    6/1956    McIlvried _____ 72—289

FOREIGN PATENTS 1,092,801    11/1967    Great Britain.

CHARLES W. LANHAM, Primary Examiner

LOWELL A. LARSON, Assistant Examiner

U.S. Cl. X.R.

72—289